United States Patent
Muranaka et al.

[11] Patent Number: 5,728,020
[45] Date of Patent: Mar. 17, 1998

[54] PULLEY AND BALL BEARING FOR PULLEYS

[75] Inventors: Masahiro Muranaka, Iwata; Masao Fukuwaka, Shizuoka-ken, both of Japan

[73] Assignee: NTN Corporation, Osaka, Japan

[21] Appl. No.: 707,402

[22] Filed: Sep. 4, 1996

[30] Foreign Application Priority Data

Sep. 6, 1995 [JP] Japan ................................. 7-229377

[51] Int. Cl.$^6$ .............................. F16H 57/04; F10C 33/66
[52] U.S. Cl. ............................................ 474/199; 384/462
[58] Field of Search ........................... 474/91, 199, 903; 384/462, 544, 546, 547

[56] References Cited

U.S. PATENT DOCUMENTS

| | | | |
|---|---|---|---|
| 4,402,678 | 9/1983 | St. John | 474/199 X |
| 4,509,869 | 4/1985 | Johnston | 384/462 |
| 4,568,316 | 2/1986 | Veikley et al. | 474/199 X |
| 4,602,875 | 7/1986 | Doerr et al. | 384/547 |
| 5,421,788 | 6/1995 | Toth | 474/199 X |

Primary Examiner—Thomas R. Hannon
Attorney, Agent, or Firm—Nikaido, Marmelstein, Murray & Oram LLP

[57] ABSTRACT

A pulley which is brought into contact with a timing belt of an engine of automobile and a belt for driving auxiliary machinery, and a ball-bearing used for the same, wherein the radial internal clearance in the running state of a ball bearing is set to substantially 5 to 30 µm, and grease to be sealed in said ball bearing is such that the base oil thereof is made a mixture of α-olefin oligomer and ester, the thickening agent thereof is made a mixture of an alicyclic urea compound and an aliphatic urea compound, the worked penetration thereof is roughly 240, and the base oil viscosity thereof is made 40 to 43 cSt at a temperature of 40° C., whereby it is possible to suppress self-excited vibrations of a rolling element and to securely prevent the hoot sound from occurring. Furthermore, since grease used herein has superior characteristics in the high temperature durability, there is no worry about a lowering of the high temperature durability as in conventional pulleys in which low temperature grease of good low temperature characteristics is employed.

4 Claims, 5 Drawing Sheets

FIG.IA
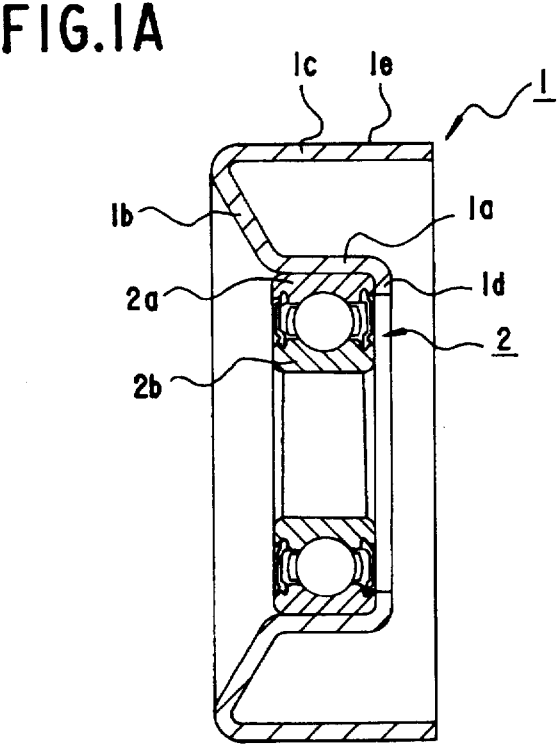
FIG.IB
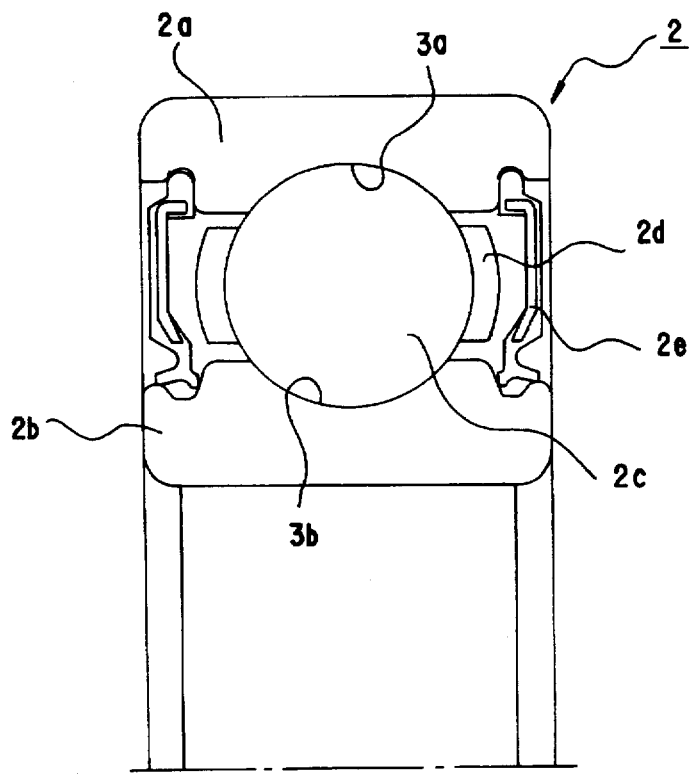

FIG.2

TABLE OF CHARACTERISTICS OF GREASE

| NAME OF GREASE | BASE OIL | THICKENING AGENT | WORKED PENETRATION (60 TIMES) | BASE OIL VISCOSITY (40°C) |
|---|---|---|---|---|
| GREASE A | PAO (80)+ ESTER (20) | ALICYCLIC UREA (20WT%) | 245 | 81.2 |
| GREASE B | PAO (70)+ DAPE (30) | AROMATIC UREA (25WT%) | 301 | 41.7 |
| GREASE C | PAO (75)+ ESTER (25) | ALICYCLIC UREA + ALIPHATIC UREA (12WT%) | 243 | 40.6 |
| GREASE D | PAO (80)+ ESTER (20) | ALICYCLIC POLYUREA + ALIPHATIC POLYUREA | 245 | 42.7 |
| GREASE E | DAPE (100) | AROMATIC UREA | 283 | 123.0 |

FIG.3

RATIO OF OCCURRENCE OF ABNORMAL NOISE (%)

| CLEARANCE OF INCORPORATION | GREASE A | GREASE B | GREASE C | GREASE D | GREASE E |
|---|---|---|---|---|---|
| AIMING AT 0μm | 41.4 | 22.9 | 20.9 | 53.0 | 49.0 |
| AIMING AT 20μm | 27.1 | 0.0 | 0.0 | 5.0 | 75.0 |

PULLEY AND BALL BEARING FOR PULLEYS

BACKGROUND OF THE INVENTION

The present invention relates to a pulley and a ball bearing for the same, and in particular relates to a pulley which is brought into contact with a timing belt of an engine of an automobile and a belt for driving auxiliary machinery, and a ball bearing used for the same.

In a timing belt of an engine for automobiles and a belt for driving auxiliary machinery, a pulley is disposed in order to increase the winding application angle of said belt and to give the same a reasonable tension. Some pulleys are such that the pulley circumferential face with which a belt is brought into contact is directly disposed on the outer diameter of an outer ring of a ball bearing (so-called hat type outer ring), but many of them are composed so that the pulley body having a pulley circumferential face and a ball bearing are fitted to each other to be integral.

In these kinds of pulleys, when the pulley body is caused to rotate upon receiving a rotation driving force from a belt, the outer ring of said ball bearing fitted thereto rotates together with the pulley body.

However, if such a pulley is attempted to be operated when it is cold, there are cases there an abnormal noise (hoot sound) occurs, depending on a given specification of the pulley and/or operational condition. This abnormal noise when it is cold, so-called abnormal noise under cold ambient, will not necessarily occur 100% in the field application. The same is influenced by ambient temperature and will occur in only a limited area (for example Hokkaido Prefecture in Japan). Furthermore, such abnormal noise under cold ambient occurs in a brief time (within 1 minute at the longest) after the starting of an engine of an automobile. Thereafter, no abnormal noise under cold ambient will occur. Still furthermore, such abnormal noise often occurs in a case of using deep groove ball bearing of a single row type as a bearing, and the ratio of occurrence thereof will be decreased in a case where a deep groove ball bearing of a plural row type is used.

Although said abnormal noise under cold ambient has complicated characteristics as described above and it is very difficult to reproduce such abnormal noise under cold ambient, the causes of occurrence thereof have not yet been made clear. In addition, since pulleys used for automobiles are obliged to rotate at a high speed in a high temperature environment, no measure which may result in a lowering of the durability will be employed because the durability is one of the important factors for such pulleys.

Judging from these reasons, it is a fact that, at this moment, no effective and conclusive means is proposed as a countermeasure against such abnormal noise under cold ambient of pulleys.

It is therefore an object of the invention to provide a means which is able to suppress abnormal noise under cold ambient or prevent the same from occurring with the functions of a pulley secured, taking the durability and production cost into consideration.

SUMMARY OF THE INVENTION

Generally when it is cold ambient, the oil film on the raceway surface is apt to become uneven or irregular due to an increase of the base oil viscosity of grease. When such unevenness or irregularity of the oil film occur, the friction coefficient between the rolling element and raceway surface is obliged to generate minute cyclic changes, whereby self-excited vibrations occur at the rolling element.

The present applicant confirmed some occurrence mechanisms of said abnormal noise under cold ambient through re-appearance tests thereof.

(1) When abnormal noise occurred under cold ambient, a pulley (outer ring) was being vibrated in the axial direction. Furthermore, the frequency component at that time corresponded to the acoustic frequency of said abnormal noise under cold ambient (hoot sound).

(2) No frequency component is recognized when no abnormal noise under cold ambient occurs.

(3) The frequency component when such abnormal noise occurred under cold ambient, the same phase is recognized at two measuring points 180° apart from each other on the end face of the pulley.

Judging from these investigations, although the occurrence mechanism of said abnormal noise under cold ambient has not been made completely clear yet, it is considered that the self-excited vibrations of a rolling element are an important factor. Therefore, as a countermeasure against such abnormal noise under cold ambient, the present invention is to provide, on the basis of the abovementioned inference, a construction by which the self-excited vibrations of a rolling element are able to be effectively suppressed.

Since ever, as a countermeasure against such abnormal noise under cold ambient, use of grease having a superior property at lower temperature (that is, such in which an oil film is uniformly formed on the contacting portions between the rolling element and the raceway surface of the inner and outer rings even when it is cold) has been proposed. This countermeasure is such that it attempts to suppress occurrence of the abnormal noise under cold ambient by increasing the lubrication ability of grease under cold ambient. With this countermeasure, a considerable effect can be expected. However, such a grease has a lower viscosity, so as to provide an insufficient lubrication ability at high temperature. This may lead to a reduced durability of the pulley.

Thus, it is necessary to satisfy two conflicting features, one of which is the stability of oil film at a low temperature, and the other of which is the durability at a high temperature, in grease to which the countermeasure against such abnormal noise under cold ambient is taken. Therefore, the selection thereof is not easy.

In view of the abovementioned points, the present applicant carried out re-appearance tests of abnormal noise under cold ambient with different brands of grease under the same conditions in order to specify the characteristics of effective grease to suppress the abnormal noise under cold ambient, and obtained the ratio of abnormal noise occurrence in the respective cases. A deep groove ball bearing regulated in Japanese Industrial Standards No. JIS-6203 (the retainer thereof is made of steel) was used as a bearing for experiments, and five brands of grease whose characteristics are different from each other as shown in FIG. 2 were prepared as grease.

FIG. 4 through FIG. 6 show the results of experiments (As for the evaluation method of data, refer to FIG. 6), and FIG. 3 shows the data obtained by summarizing the above experimental results. In the respective data shown in FIG. 4 through FIG. 6, the left side thereof shows the data in a case where the running internal clearance (the radial internal clearance of the bearing in a steady running state) is set to be small (that is, a case of aiming at zero clearance), and the right side shows the data in a case where the running internal clearance is set to be large (that is, aiming at a clearance of 20 μm).

From the above experimental results, the following points are made clear.

(1) Among the five brands of grease, greases B, C and D are effective to prevent or suppress the abnormal noise from occurring.

(2) As for the running internal clearance of bearings, 20 μm is more effective than 0 to prevent or suppress abnormal noise.

Firstly, the verification regarding (1) is carried out. As described above, three kinds of grease B, C and D are effective as a countermeasure against the abnormal noise under cold ambient. However, when separately carrying out the durability tests in respect to these three kinds of grease, it is found that greases C and D have a sufficient durability. Therefore, greases C and D have superior durability but grease B is remarkably short of the ability in the oil film stability at low temperature and the durability at a high temperature, and the same are favorable as grease for pulley bearings.

In either case, the composition of these two kinds of grease is, as been made clear in FIG. 2, such that the base oil thereof is made a mixture of PAO (α-olefin oligomer) and ester, the thickening agent thereof is made a mixture of an alicyclic urea compound and an aliphatic urea compound, the worked penetration thereof is around 240, and the base oil viscosity thereof is made about 40 cSt. Therefore, it is considered that the grease having the abovementioned characteristics is effective at a countermeasure against abnormal noise under cold ambient.

Next, the verification regarding (2) is carried out. In general ball bearings, when the radial internal clearance (running internal clearance) in a steady running state is slightly negative, the bearing life will be maximum. However, if the negative clearance quantity is increased due to changes of certain use conditions, a remarkable lowering of the life and heat generation will result therefrom. Usually, as a safety value, the running internal clearance is set to be slightly larger than zero while attempting to obtain zero. To the contrary, as described above, it is clear that the abnormal noise under cold ambient is able to be more securely prevented from occurring in a case where the running internal clearance is set to be around 20 μm than in a case where the same is set to be zero. This can be presumed as described below; that is, the larger the running internal clearance becomes, the more the load is concentratedly applied to balls in the load area, whereby resultantly, the facial pressure of balls is increased to cause the rigidity of bearings in the axial direction to be heightened and to cause the minute vibrations of pulley in the axial direction to be suppressed, and since the number of inherent vibrations is increased, the same is deviated from the resonance area of abnormal noise. Since the facial pressure of the individual balls is decreased in a case where the running internal clearance is zero or negative, the bearing rigidity is lowered to cause minute vibrations of a pulley in the axial direction to be likely to occur. Furthermore, it is considered that, since the number of inherent vibrations exists in the resonance area of the hoot sound, the same is likely to occur.

However, if the running internal clearance is set to be excessively large, vibrations and noise are apt to occur, and the bearing life is lowered. Therefore, it is not favorable to infinitely increase the running internal clearance. It is considered that it is favorable for the optimal range of the running internal clearance to be set to substantially 5 to 30 μm.

On the basis of the abovementioned verification, a pulley according to the invention has a ball bearing incorporated In a pulley body having a pulley circumferential face which is brought into contact with a belt driven by an engine of automobile, and is characterized in that the radial internal clearance in the running state of a ball bearing is set to substantially 5 to substantially 30 μm, and grease to be sealed in said ball bearing is such that the base oil thereof comprises a mixture of α-olefin oligomer and ester, the thickening agent thereof comprises a mixture of an alicyclic urea compound and an aliphatic urea compound, the worked penetration thereof is roughly 240, and the base oil viscosity thereof is made 40 to 43 cSt at a temperature of 40° C. It is noted that the radial internal clearance means a state before a bearing is attached to a pulley, with any one of the inner ring or outer ring fixed, the moving quantity of a bearing ring when the bearing ring which is not fixed is moved in the radial direction. And "urea" means not only urea in itself but also a polyurea.

In the above pulley, if the retainer of a ball bearing is made of resin, it is possible to secure a further better effect of suppressing the abnormal noise under cold ambient. Furthermore, the pulley body may be formed integral with the outer ring.

A ball bearing for pulleys according to the invention, which is incorporated in the pulley body having a pulley circumferential face being brought into contact with a belt driven by an engine of automobile, is such that the radial internal clearance in the running state is set to substantially 5 to 30 μm, and grease to be internally sealed therein is such that the base oil thereof comprises a mixture of α-olefin oligomer and ester, the thickening agent thereof comprises a mixture of an alicyclic urea compound and an aliphatic urea compound, the worked penetration thereof is roughly 240, and the base viscosity thereof is made 40 to 43 cSt at a temperature of 40° C.

As explained above, according to a pulley and bearing for the same, it is possible to suppress self-excited vibrations of a rolling element and to securely prevent the abnormal noise from occurring. Furthermore, since grease used herein has superior characteristics in the high temperature durability, there is no worry about a lowering of the high temperature durability as in conventional pulleys in which low temperature grease of good low temperature characteristics is employed. Furthermore, since the structure of a bearing is not complicated, pulleys and bearings for the same according to the invention are suitable for the mass production system, and they are advantageous in the production cost.

BRIEF DESCRIPTION OF THE DRAWINGS

FIG. 1A shows a cross-sectional view of an idler pulley used in a belt transmission device according to the invention and FIG. 1B shows an enlarged view of major parts of the same.

FIG. 2 is a table showing the characteristics of grease used in the experiments.

FIG. 3 is a table showing the ratio of occurrence of abnormal noise of each of the grease.

DESCRIPTION OF THE PREFERRED EMBODIMENT

Figure 4:
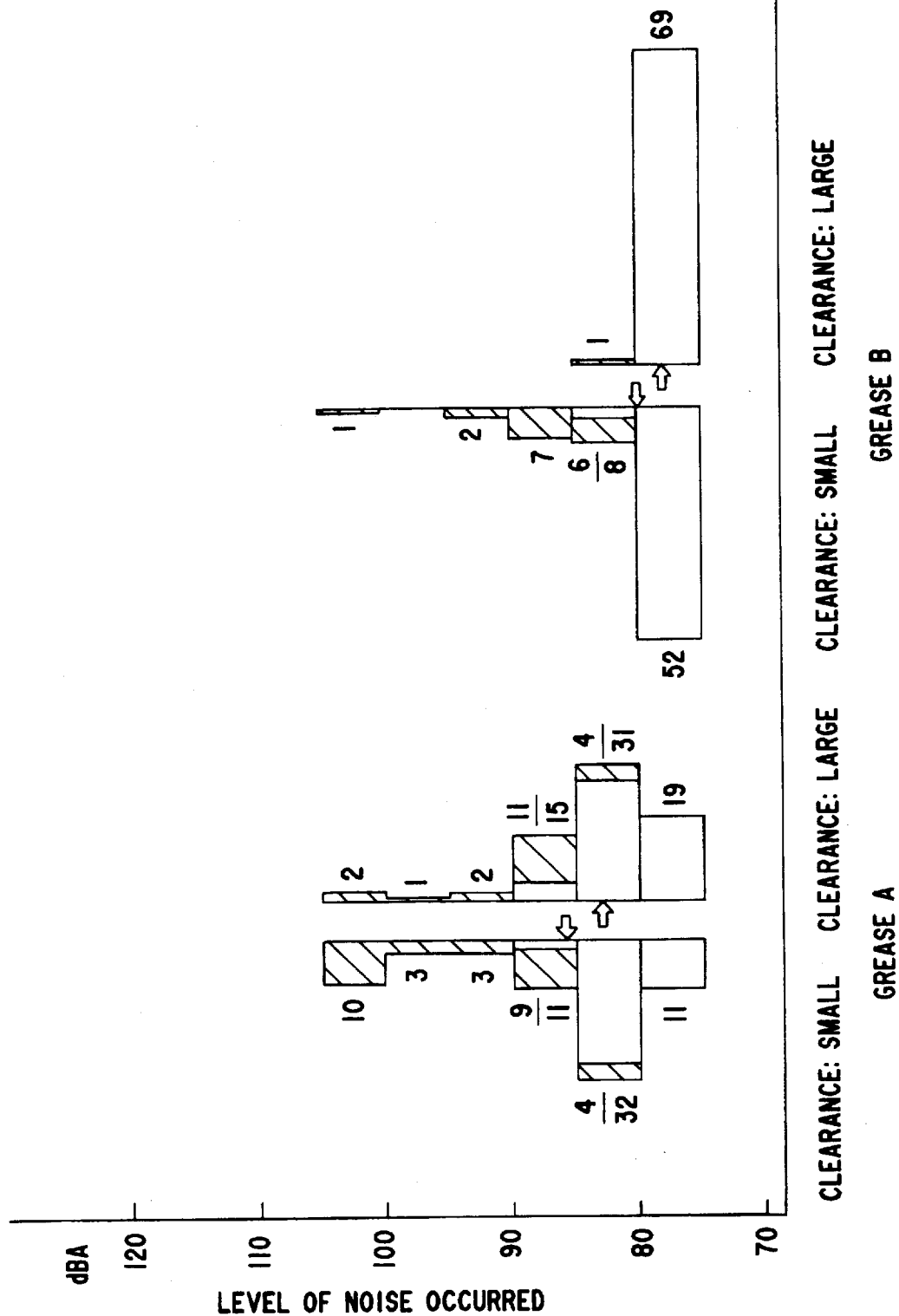
FIG. 4 is a diagram showing the results of reappearance tests of the abnormal noise under cold ambient of each of the grease.
Figure 5:
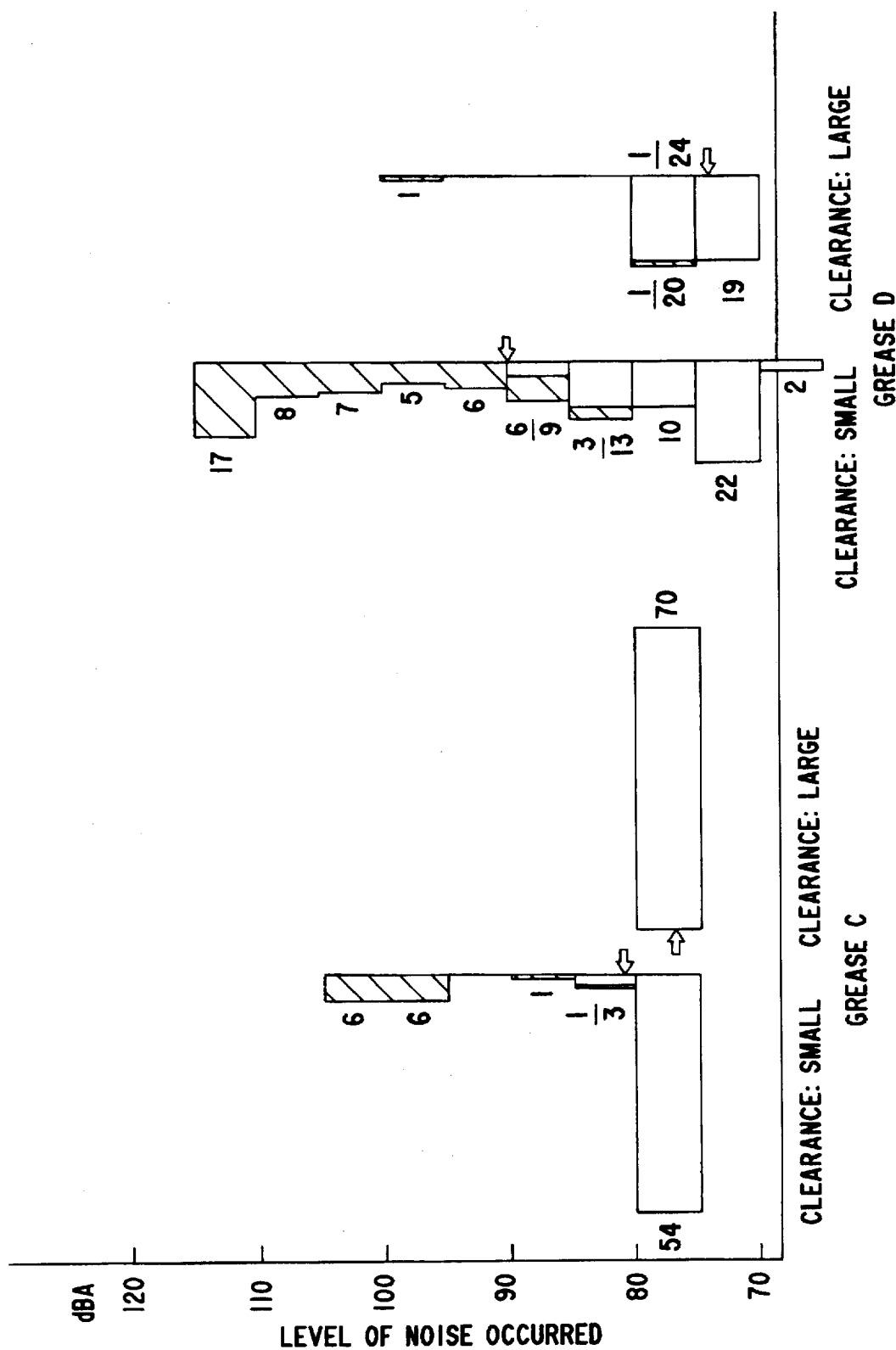
FIG. 5 is a diagram showing the results of reappearance tests of the abnormal noise under cold ambient of each of the grease.
Figure 6:
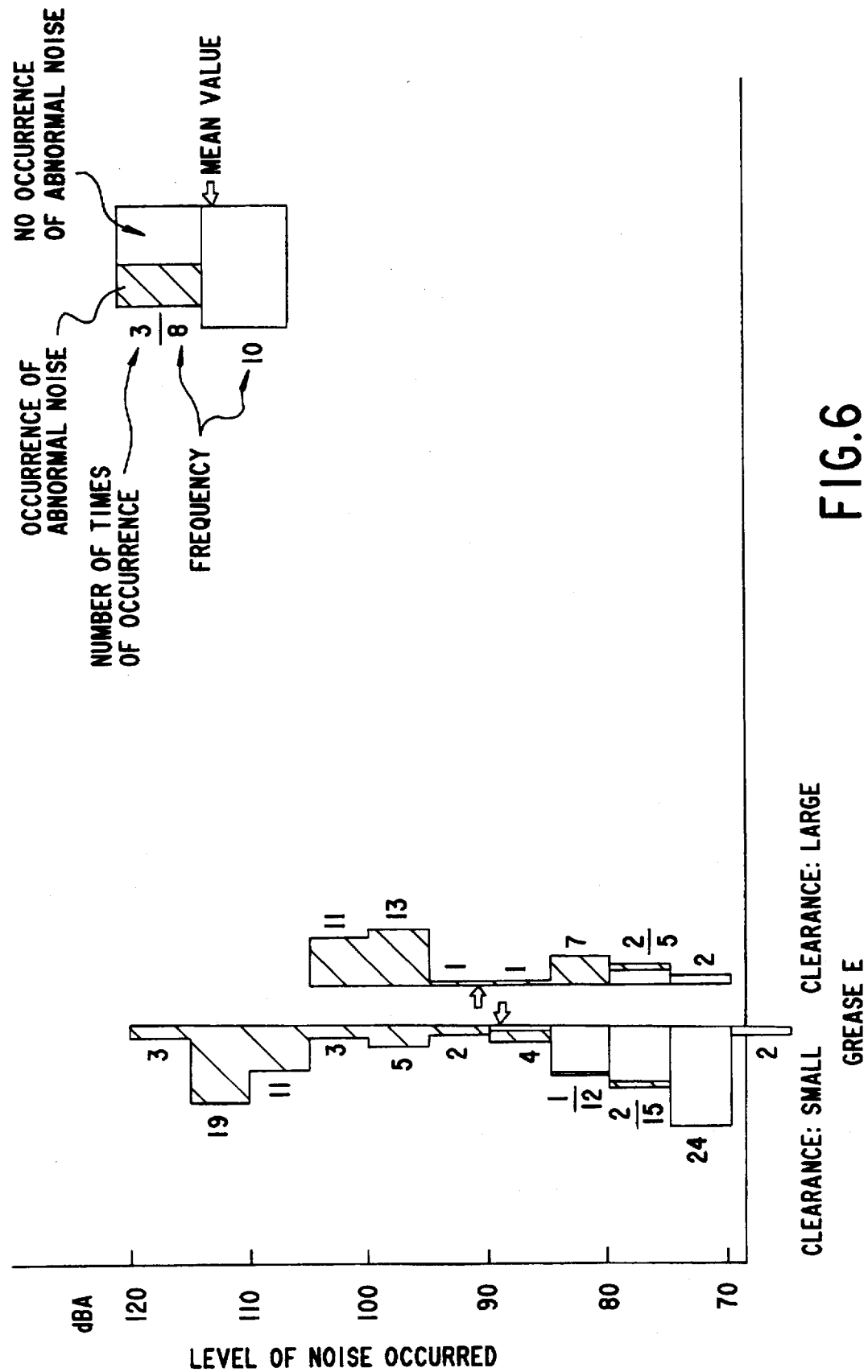
FIG. 6 is a diagram showing the results of reappearance tests of the abnormal noise under cold ambient of each of the grease.

With reference to FIG. 1, a description will be given of the construction of a pulley and a ball bearing for the same according to the invention.

A pulley shown in FIG. 1(a) is an idler pulley used for a belt for driving auxiliary machinery of automobiles, and consists of a steel plate pressed pulley body (1) and a deep groove ball bearing (2) of single row type fitted in the internal bore of said pulley body (1). Said pulley body (1) is an annular member comprised of an inner diameter cylindrical part (1a), a flange part (1b) outer-diametrically extending from one end of said inner diameter cylindrical part (1a), an outer diameter cylindrical part (1c) extending in the axial direction from said flange part (1b), and a lug part (1d) inner-diametrically extending from the other end of said inner diameter cylindrical part (1a). The outer ring (2a) of a ball bearing (2) is fitted onto the inner bore of the inner diameter cylindrical part (1a), and the pulley circumferential face (1e) which is brought into contact with a belt is incorporated onto the outer diameter of the outer diameter cylindrical part (1c). By causing said pulley circumferential face (1e) to be brought into contact with a belt, the pulley achieves a role as an idler.

As shown in FIG. 1(b), said ball bearing (2) consists of an outer ring (2a) fitted in the inner bore of the inner diameter cylindrical part (1a) of the pulley body (1), an inner ring (2b) fitted to the fixing axis (not illustrated), a plurality of balls (2c) incorporated between the raceway surfaces (3b),(3a) of the inner and outer rings (2b),(2a), a retainer (2d) for equidistantly retaining said balls on the circumference, and a pair of seals (2e) which seal grease, wherein the outer ring (2a) and inner ring (2b) are formed integrally with each other. The retainer (2d) may be made of steel. However, it is favorable that the same is made of resin which is more advantageous in view of preventing the abnormal noise under cold ambient from occurring.

Grease C (Grease for motors produced by Nippon Grease Corp., Brand name: MP-1) used in the above experiments may be used as grease sealed in said ball bearing (2). This grease is such that the base oil thereof is made a mixture of PAO and ester, the thickening agent thereof is made a mixture of an alicyclic urea compound and an aliphatic urea compound, the worked penetration thereof is 243, and the base oil viscosity thereof is made 40.6 cSt at a temperature of 40° C.

"PAO" is an α-olefin (α-olefin oligomer) generated by oligomerization of ethylene and has good features in view of the high temperature stability and low temperature fluidity.

As a matter of course, grease D (produced by Nippon Petroleum Corp, brand name: U914K) which displayed effects of preventing abnormal noise from occurring, which are equal to those of grease C in the experiments may be employed instead of grease C.

Furthermore, in addition to the above grease, it can be considered that if the viscosity of the base oil is 60 cSt or less at a temperature of 40° C., is free from any radical change in the viscosity at a low temperature, and the non-worked penetration is around 200 at a temperature of −20° C., such grease will be able to bring certain suppressing effects of such abnormal noise.

What is claimed is:

1. A pulley having a ball bearing incorporated in a pulley body having a pulley circumferential face which is brought into contact with a belt driven by an engine of an automobile, being characterized in that the radial internal clearance in the running state of a ball bearing is set to substantially 5 to 30 μm, and grease to be sealed in said ball bearing is such that:

the base oil thereof comprises a mixture of α-olefin oligomer and ester, the thickening agent thereof comprises a mixture of an alicyclic urea compound and an aliphatic urea compound, the worked penetration thereof is roughly 240, and the base oil viscosity thereof is made 40 to 43 cSt at a temperature of 40° C.

2. A pulley as set forth in claim 1, wherein a retainer of said ball bearing is made of resin.

3. A pulley as set forth in claim 1, wherein the pulley body and outer ring are formed integrally with each other.

4. A ball bearing for pulleys, which is incorporated in the pulley body having a pulley circumferential face being brought into contact with a belt driven by an engine of an automobile, being characterized in that the radial internal clearance in the running state is set to 5 substantially to 30 μm, and grease to be internally sealed therein is such that:

the base oil thereof comprises a mixture of α-olefin oligomer and ester, the thickening agent thereof comprises a mixture of an alicyclic urea compound and an aliphatic urea compound, the worked penetration thereof is roughly 240, and the base oil viscosity thereof is made 40 to 43 cSt at a temperature of 40° C.

* * * * *